United States Patent
Mizuno et al.

(10) Patent No.: US 7,721,614 B2
(45) Date of Patent: May 25, 2010

(54) GEAR TRANSMISSION INCLUDING IMPROVED SHIFTER ENGAGING STRUCTURE, AND VEHICLE INCLUDING SAME

(75) Inventors: Kinya Mizuno, Wako (JP); Seiji Hamaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 577 days.

(21) Appl. No.: 11/708,891

(22) Filed: Feb. 21, 2007

(65) Prior Publication Data

US 2007/0199392 A1    Aug. 30, 2007

(30) Foreign Application Priority Data

Feb. 24, 2006    (JP) ............................. 2006-047993

(51) Int. Cl.
*F16H 3/08*    (2006.01)
(52) U.S. Cl. ....................................................... 74/325
(58) Field of Classification Search .................. 74/329, 74/332, 340
See application file for complete search history.

(56) References Cited

U.S. PATENT DOCUMENTS 4,094,206 A * 6/1978 Sogo et al. ..................... 74/360
6,588,292 B2 * 7/2003 Yamasaki et al. .............. 74/340
2007/0074594 A1 * 4/2007 Mizuno et al. .............. 74/337.5

FOREIGN PATENT DOCUMENTS

JP    2000-205352    7/2000

* cited by examiner

*Primary Examiner*—Sherry L Estremsky
*Assistant Examiner*—Edwin A. Young
(74) *Attorney, Agent, or Firm*—Carrier, Blackman & Associates, P.C.; Joseph P. Carrier; William D. Blackman

(57) ABSTRACT

A gear transmission permits an increased flexibility in the layout of shift gears and reduces the axial size of the transmission by providing an engaging portion on a specific one of the shift gears. The gear transmission includes a main shaft having drive gears, a countershaft having driven gears adapted to be respectively driven by the drive gears to set predetermined shift positions, and shifters engageable with specific gears of the drive gears and the driven gears. The specific gears respectively have engaging portions for engaging the shifters, whereby the main shaft rotationally drives the countershaft through any one of the shifters and any one of the specific gears at any one of the predetermined shift positions. Of the engaging portions, the outer diameter of the engaging portion is larger than the outer diameter of a toothed portion of the drive gear as one of the specific gears.

22 Claims, 5 Drawing Sheets

GEAR TRANSMISSION INCLUDING IMPROVED SHIFTER ENGAGING STRUCTURE, AND VEHICLE INCLUDING SAME

CROSS-REFERENCE TO RELATED APPLICATIONS

The present invention claims priority under 35 USC 119 based on Japanese patent application No. 2006-047993, filed on Feb. 24, 2006. The subject matter of this priority document is incorporated by reference herein.

BACKGROUND OF THE INVENTION

1. Field of the Invention

The present invention relates to a vehicle gear transmission including a main shaft having a predetermined number of drive gears, and a countershaft having a predetermined number of driven gears adapted to be respectively driven by the drive gears so as to set a predetermined number of shift positions. The gear transmission also includes a shifter engageable with the drive gears or the driven gears so that the main shaft rotationally drives the countershaft at any one of the shift positions.

2. Description of the Background Art

A conventional gear transmission is known to include a main shaft having a plurality of drive gears, a countershaft having a plurality of driven gears, and a shifter adapted to be moved on the main shaft or the countershaft. In the conventional transmission, the shifter is engageable with the drive gears or the driven gears so that the main shaft rotationally drives the countershaft at any one of a plurality of shift positions set by the combination of the drive gears, and the driven gears respectively driven by the drive gears. Such a transmission is disclosed, for example, in Japanese Patent Laid-Open No. 2000-205352.

The shifter in such a gear transmission is axially moved on the main shaft or the countershaft. Accordingly, the drive gears or the driven gears (both of which will be hereinafter generically referred to as "shift gears") engageable with the shifter have engaging portions axially projecting toward the shifter. However, in a small-diameter gear of the plural shift gears, the radial width of a disc portion of the small-diameter shift gear is small, so that it is difficult to form the engaging portion on the disc portion. Herein, a disc portion of the shift gear corresponds to the annular portion formed between a toothed portion of the shift gear and the main shaft or the countershaft. Accordingly, the engaging portion is usually formed on a large-diameter shift gear meshing with the above small-diameter shift gear.

However, the large-diameter shift gear which includes the engaging portion is increased in weight, and the weight of the shifter may be increased in proportion thereto. Further, in some circumstances, an increased number of shifters must be provided according to the layout of the shift gears, causing an increase in weight of the transmission or an increase in axial size of the transmission.

Further, the first speed drive gear on the main shaft is usually formed integrally with the main shaft by directly working a large-diameter portion of the main shaft into a gear, and the second and higher speed drive gears are mounted from an axial end of the main shaft toward the first speed shift gear. However, in a transmission having two shift clutches (twin clutch), the main shaft is provided by a shaft having a double structure such that the shaft is composed of a first shaft, and a hollow second shaft that is fitted to the outer circumference of the first shaft. In addition, the first speed drive gear is formed integrally with the first shaft. In the case that an axially positioning portion (e.g., projecting portion) is provided on the first shaft so as to prevent the axial movement of the second shaft, there is a possibility that the second and higher speed drive gears cannot be mounted between the first speed drive gear and the axially positioning portion.

It is accordingly an object of the present invention to increase the flexibility of layout of the shift gears and reduce the axial size of the transmission by providing an engaging portion on a specific one of the shift gears. It is another object of the present invention to make it easy to manufacture the specific gear having the engaging portion. It is a further object of the present invention to prevent an increase in axial size of the transmission.

SUMMARY

In accordance with a first aspect of the invention, there is provided a gear transmission comprising a main shaft for receiving power from an engine, the main shaft including a predetermined number of drive gears. The gear transmission includes a countershaft having a predetermined number of driven gears, the number of which is the same as the number of the drive gears. The driven gears are respectively driven by the drive gears to set predetermined shift positions. The gear transmission also includes a shifter, adapted to be moved on the main shaft or the countershaft to thereby come into engagement with a specific gear of the drive gears and the driven gears. The specific gear has an engaging portion for engaging the shifter, whereby the main shaft rotationally drives the countershaft through the shifter and the specific gear at any one of the predetermined shift positions. According to the first aspect of the invention, the outer diameter of the engaging portion is larger than the outer diameter of a toothed portion of the specific gear.

With this arrangement, the shifter comes into engagement with the engaging portion of the specific gear at a radial position outside of the toothed portion of the specific gear. Accordingly, the shift gear, having a small diameter such that the radial width of the disc portion is smaller than the radial width of the engaging portion, can be used as the specific gear, thereby increasing the number of choices of gears for the specific gear.

According to the first aspect of the invention, the following effect can be exhibited. Any shift gear can be used as the specific gear without depending upon the outer diameter of the shift gear, so that the flexibility of layout of the shift gears on the main shaft and the countershaft can be increased and the flexibility of layout of the shifter can also be increased. Further, the specific gear and the shifter can be reduced in weight to thereby allow a reduction in size and weight of the transmission.

In accordance with a second aspect of the invention, and including the configuration of the first aspect thereof, the specific gear comprises a body and an engaging portion forming member. The body has a toothed portion, and the engaging portion forming member is detachably mounted on the body and includes the engaging portion.

With this arrangement, the body having the toothed portion and the engaging portion forming member having the engaging portion can be manufactured separately from each other. As a result, the toothed portion can be formed without the limitation by the engaging portion larger in outer diameter than the toothed portion, that is, the body is easily manufactured.

According to the second aspect of the invention, the specific gear, having the engaging portion larger in outer diameter than the toothed portion, can be easily manufactured, thereby reducing manufacturing costs.

In accordance with a third aspect of the invention, and including the configuration of the first or second aspects thereof, the specific gear is a gear having a smallest outer diameter from among the gears provided in the drive gear set or in the driven gear set.

With this arrangement, the specific gear is a shift gear having a smallest outer diameter in a shift gear group including all of the drive gears or the driven gears. Accordingly, it is possible to prevent an increase in radial size of the shift gear group due to the provision of the engaging portion, which is larger in outer diameter than the toothed portion, on the specific gear.

According to the third aspect of the invention, an increase in size of the transmission can be prevented although it includes the shift gear having the engaging portion larger in outer diameter than the toothed portion.

In accordance with a fourth aspect of the invention, and including the configuration as defined in the first aspect thereof, the main shaft comprises a first main shaft and a second main shaft fitted to the outer; circumference of the first main shaft so as to be rotatable relative thereto. The drive gears comprise first drive gears provided on the first main shaft and second drive gears provided on the second main shaft. The gear transmission further comprises a first shift clutch for performing the transmission and-cut-off of the power from the engine to the first main shaft and a second shift clutch for performing the transmission and cut-off of the power from the engine to the second main shaft; and the specific gear is a first speed drive gear constituting the first drive gears.

With this arrangement, the first speed drive gear is a shift gear having a small diameter. Accordingly, in the gear transmission having the first and second shift clutches, it is possible to prevent an increase in radial size of the shift gear group due to the provision of the engaging portion, larger in outer diameter than the toothed portion, on the first speed drive gear.

According to the fourth aspect of the invention, an increase in size of the gear transmission having the first and second shift clutches can be prevented although it includes the shift gear having the engaging portion in outer diameter than the toothed portion.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 3 is a schematic cross section of the gear transmission taken along the line III-III in FIG. 1.

DETAILED DESCRIPTION

A selected illustrative embodiment of the invention winnow be described in some detail, with reference to FIGS. 1 to 4. It should be understood that only structures considered necessary for clarifying the present invention are described herein. Other conventional structures, and those of ancillary and auxiliary components of the system, are assumed to be known and understood by those skilled in the art.

Figure 1:
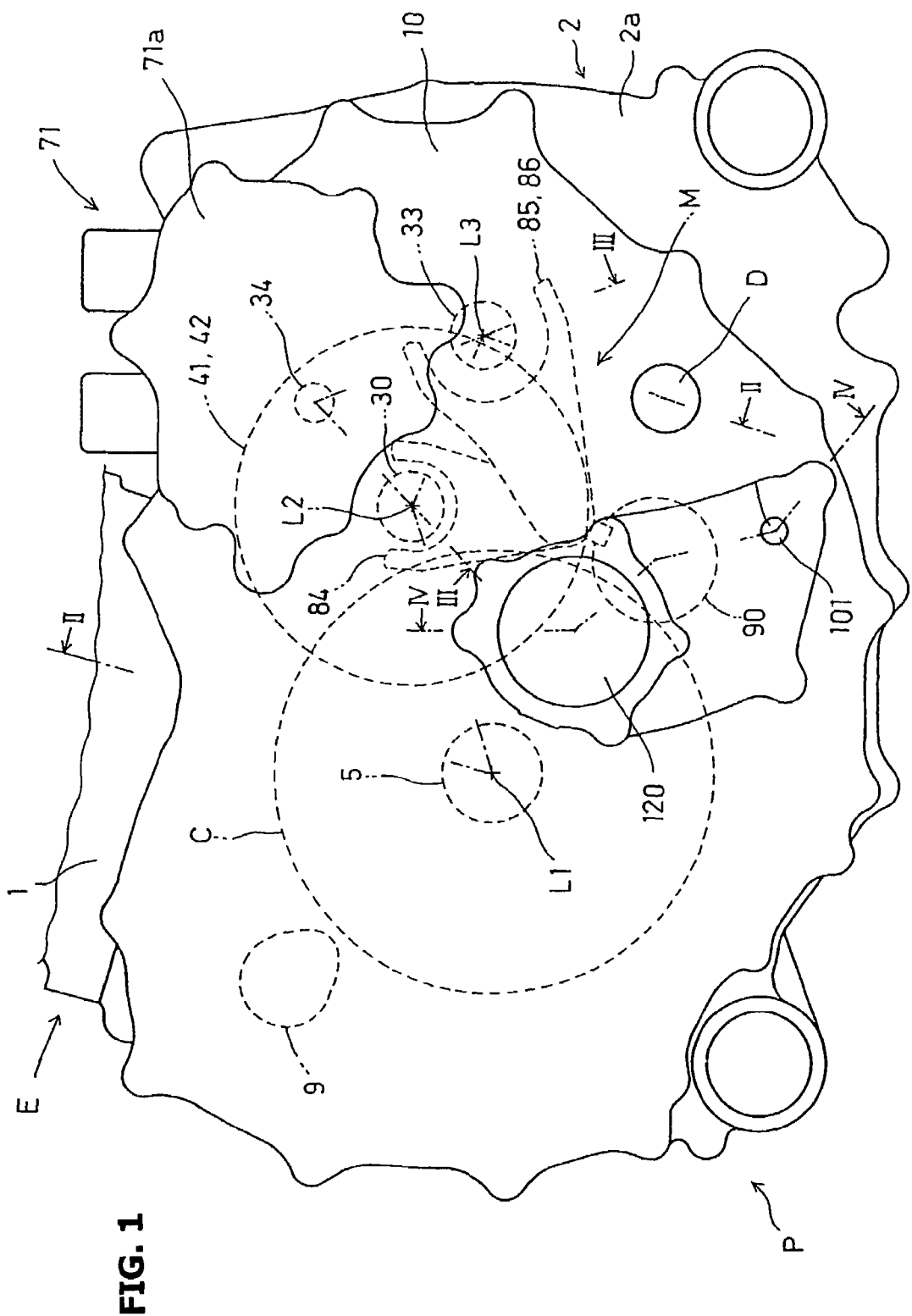
FIG. 1 is a schematic front elevation view of a power unit including a gear transmission according to the present invention.
Figure 2:
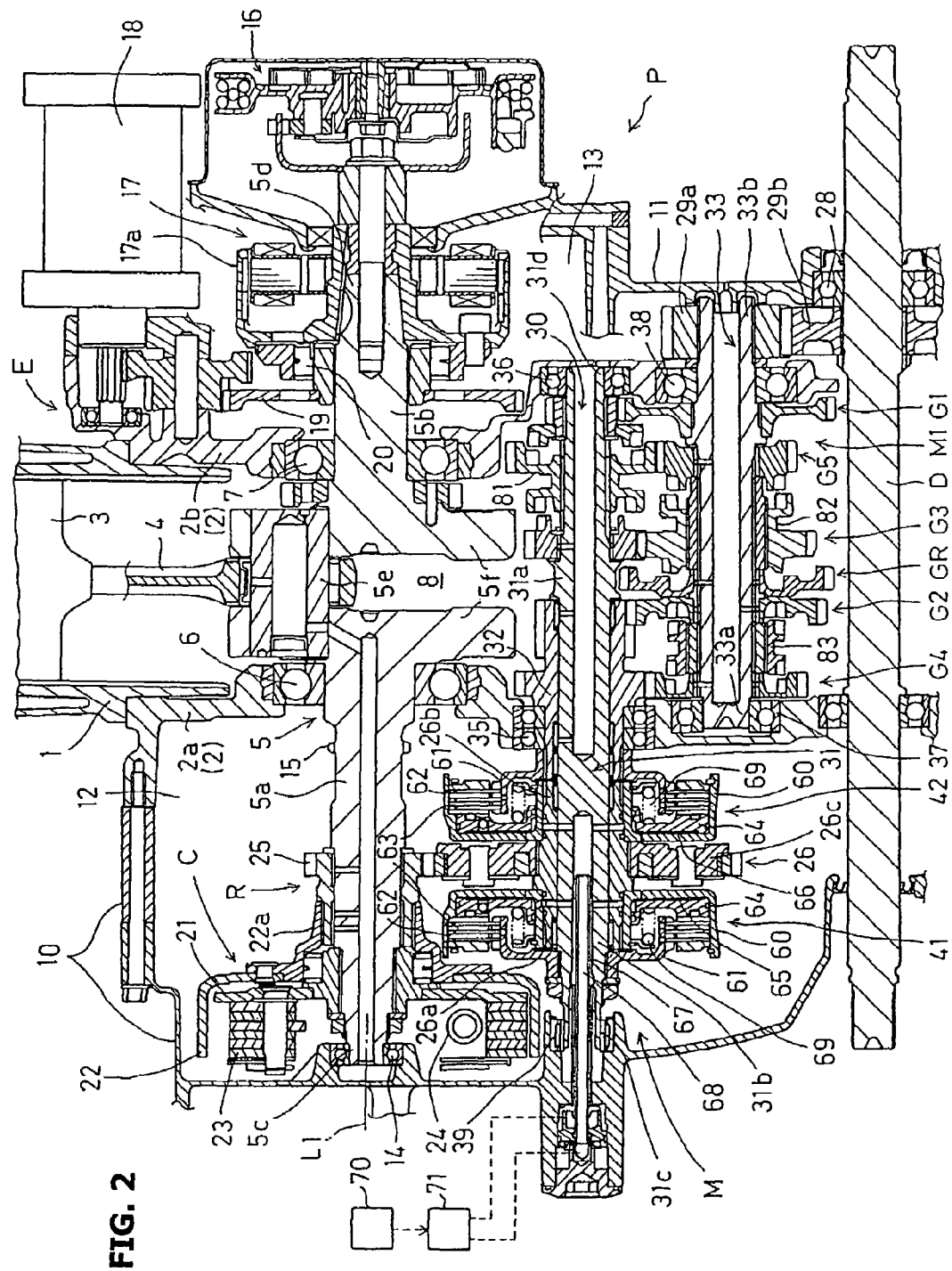
FIG. 2 is a schematic cross section of the gear transmission taken along the line II-II in FIG. 1.
Figure 5:
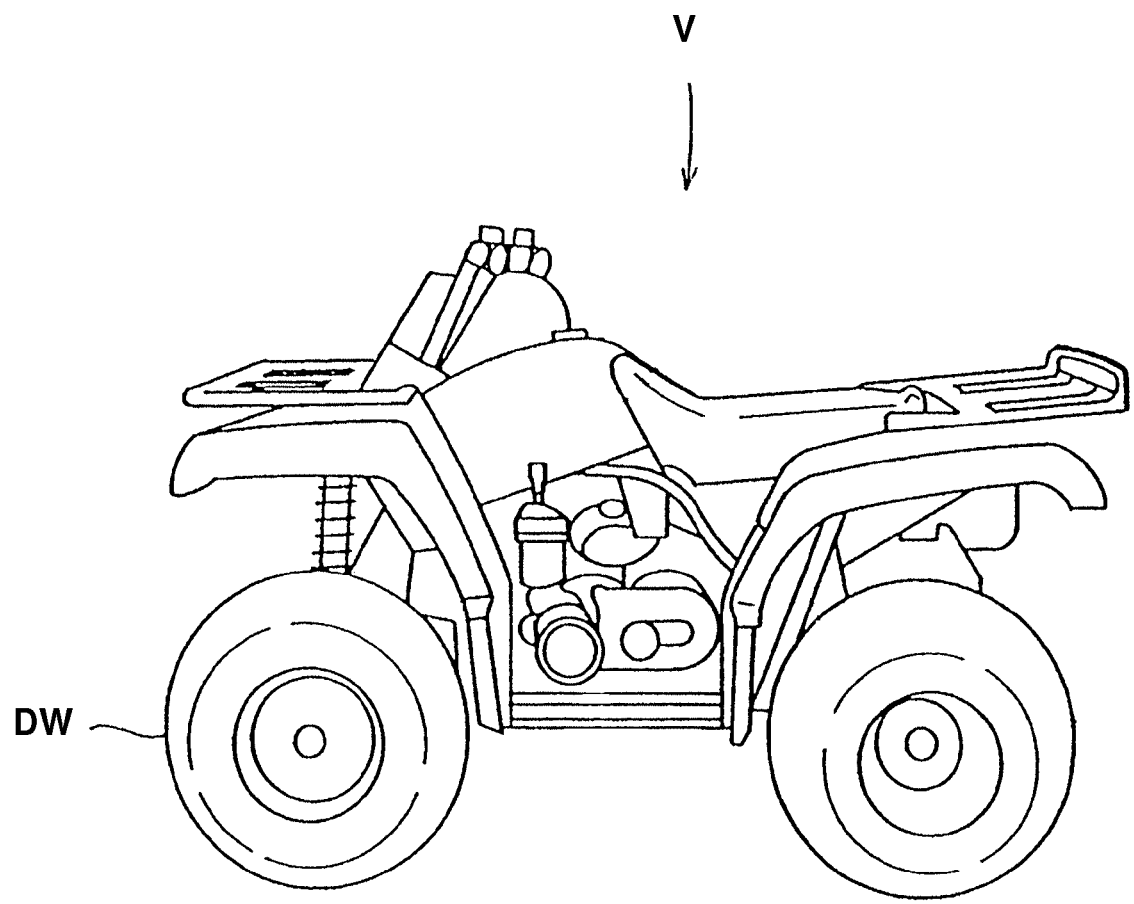
FIG. 5 is a side elevational view of a vehicle incorporating the power unit and transmission of FIGS. 1-4 therein.

Referring to FIGS. 1 and 2, reference character P generally denotes a power unit configured to be mounted on a saddle-type vehicle such as an all-terrain vehicle (ATV), adapted for operation on rough terrain. Referring also to FIG. 5, an all-terrain vehicle V, having a plurality of drive wheels DW and incorporating the power unit P, is shown. The power unit P includes an internal combustion engine E and a power transmitting device having a constant mesh gear transmission M, which is an automatic transmission according to an embodiment of the present invention. The power transmitting device includes the transmission M, a centrifugal clutch C, and a drive shaft D.

The centrifugal clutch C functions as a starting clutch for transmitting power generated from the engine E to the transmission M, and for cutting off the transmission of the power to the transmission M, as needed. Power from the transmission M is transmitted, with speed changes, via the drive shaft D and through a front propeller shaft and a rear propeller shaft, respectively, to front wheels and rear wheels, thereby rotationally driving the front and rear wheels.

In the depicted embodiment, the engine E is a water-cooled, single-cylinder, four-stroke internal combustion engine, which includes a cylinder 1, and a piston 3 reciprocally fitted in the cylinder 1. A cylinder head is joined to the cylinder 1 on the upper side thereof, a head cover is joined to the cylinder head on the upper side thereof, and a crankcase 2 is joined to the cylinder 1 at a lower end portion thereof. The cylinder 1, the cylinder head, the head cover, and the crankcase 2 cooperate to define an engine body.

The engine E also includes a crankshaft 5, which has a rotational center line L1 parallel to the longitudinal direction of a vehicle body, and which is rotatably supported through a pair of main bearings 6 and 7 to the crankcase 2. The crankcase 2 is composed of two case halves 2a and 2b divided in the direction of extension of the rotational center line L1 (which will be subsequently referred to herein as "axial direction"). In this illustrated embodiment, the two case halves 2a and 2b are a front case half 2a and a rear case half 2b, respectively, which are joined together to define a crank chamber 8 for accommodating a crank portion of the crankshaft 5. The crank portion includes a crankpin 5e and a crank web 5f.

The engine E also includes intake and exhaust valves for opening and closing intake and exhaust ports formed in the cylinder head, respectively, and an OHV type valve operating device for operating the intake and exhaust valves in synchronism with the rotation of the crankshaft 5, using push rods driven by valve operating cams of a camshaft 9. An air-fuel mixture, drawn from the intake port, is burned in a combustion chamber defined between the piston 3 and the cylinder head, and the piston 3 is driven by burned gas produced in the combustion chamber to thereby rotationally drive the crankshaft 5 through a connecting rod 4.

The crankshaft 5, as an output shaft of the engine E, has a front portion 5a and a rear portion 5b extending forwardly and rearwardly, respectively, from the crank chamber 8. The term "forwardly" or "rearwardly" means one of the axially opposite directions of the crankshaft 5.

A front cover 10 is connected to the crankcase 2 in a manner so as to cover the front side of a front case half 2a, so that a front storage chamber 12 is defined, inside the crankcase 2, between the front case half 2a and the front cover 10. The front portion 5a of the crankshaft 5 extends forwardly from the main bearing 6 fixed to the front case half 2a, so as to be disposed in the front storage chamber 12, and a front axial end 5c of the front portion 5a is supported through a bearing 14 on the front cover 10.

In addition, a rear cover 11 is connected to the crankcase 2 in a manner so as to cover the rear side of a rear case half 2b, so that a rear storage chamber 13 is defined within the crankcase between the rear case half 2b and the rear cover 11. The rear portion 5b of the crankshaft 5 extends rearwardly from the main bearing 7 fixed to the rear case half 2b, so as to be disposed in the rear storage chamber 13.

The centrifugal clutch C, a primary speed reduction mechanism R, and a drive sprocket 15 are provided on the front portion 5a of the crankshaft 5 in the front storage chamber 12 so as to be arranged in the stated order from the front axial end 5c. The drive sprocket 15 constitutes a valve operation transmitting mechanism for rotationally driving the camshaft 9. On the other hand, an AC generator 17 and a starting driven gear 19 are provided on the rear portion 5b of the crankshaft 5 in the rear storage chamber 13 so as to be arranged in the stated order from a rear axial end 5d to which a recoil starter 16 is connected. The starting driven gear 19 constitutes a starting speed reduction mechanism for transmitting the rotation of a starter motor 18 mounted on the rear cover 11 to the crankshaft 5, and is connected through a one-way clutch 20 to a rotor 17a of the AC generator 17.

The centrifugal clutch C includes a plate-like inner member 21 rotating integrally with the crankshaft 5, a bowl-shaped outer member 22 surrounding the inner member 21 on the radially outer side thereof, and a clutch shoe 23 pivotally supported on the inner member 21. The clutch shoe 23 serves as a centrifugal weight for controlling the engagement and disengagement of the centrifugal clutch C by using a centrifugal force generated according to a rotational speed of the crankshaft 5 as an engine speed. When the engine speed exceeds an idling speed, the clutch shoe 23 is pivotally moved radially outward of the crankshaft 5 by the centrifugal force against an elastic force of a clutch spring 24, thereby starting to come into contact with the outer member 22. As a result, the power of the engine E starts to be transmitted from the inner member 21 to the outer-member 22. As the engine speed increases, the centrifugal clutch C undergoes a partially engaged condition where some slip occurs between the outer member 22 and the clutch shoe 23 to allow the rotation of the outer member 22, and finally reaches a fully engaged condition where the outer member 22 is rotated integrally with the inner member 21.

The primary speed reduction mechanism R is composed of a drive gear 25 and a driven gear 26. The drive gear 25 is supported on the front portion 5a of the crankshaft 5 so as to be rotatable relative thereto and splined to a boss portion of the outer member 22 so as to be rotatable integrally therewith, and the driven gear 26 meshes with the drive gear 25. The driven gear 26 is rotatable relative to a first main shaft 31 and a second main shaft 32 of the transmission M, and has a pair of front and rear connecting portions 26a and 26b and a disc portion 26c provided on the outer circumference of the first main shaft 31. The front and rear connecting portions 26a and 26b serve as a boss portion extending forwardly and rearwardly from the disc portion 26c.

The power from the drive gear 25 is transmitted through the front and rear connecting portions 26a and 26b respectively to first and second shift clutches 41 and 42 of the transmission M. Therefore, the primary speed reduction mechanism R is a transmitting mechanism for transmitting the power from the centrifugal clutch C to the first and second shift clutches 41 and 42.

Figure 3A:
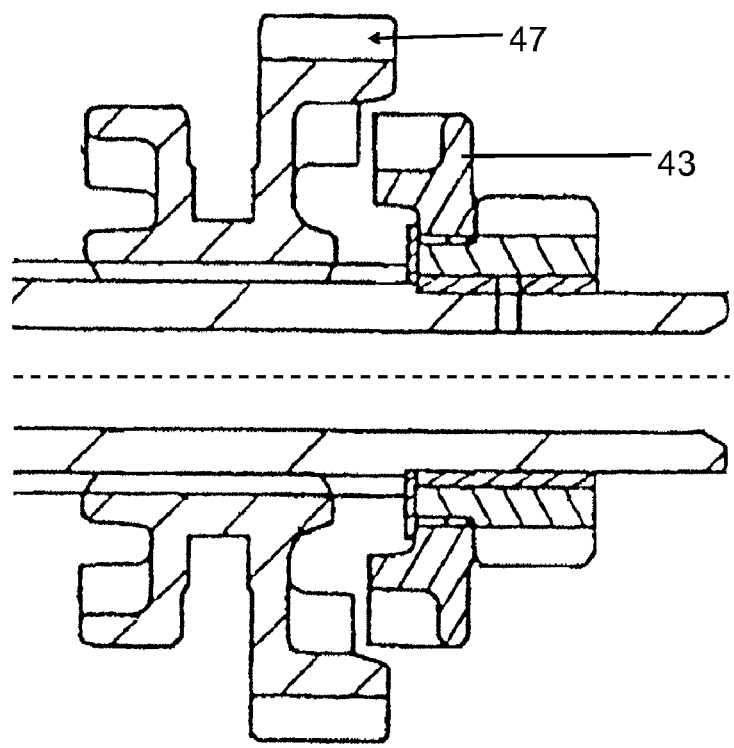
FIGS. 3A-3B are detail views of a portion of FIG. 3, showing the overlap of the engaging portion and the specific gear.
Figure 3B:
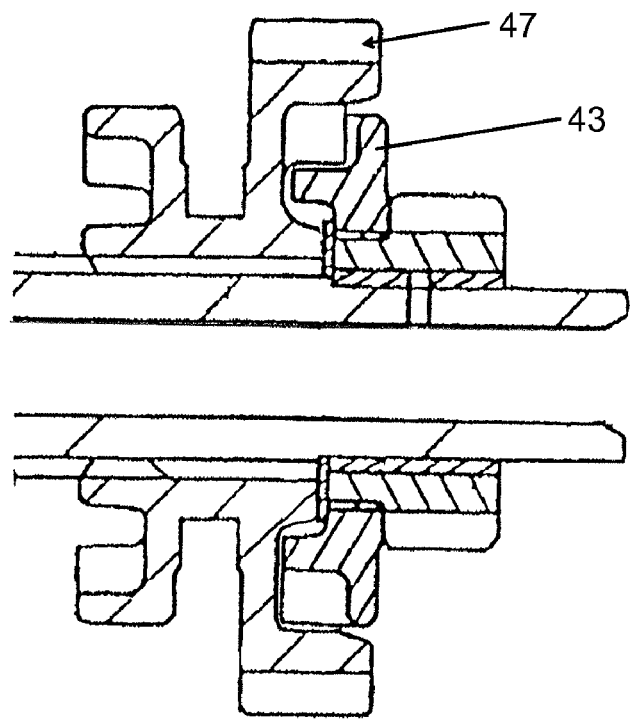

Referring also to FIG. 3, the transmission M includes a main shaft 30 which is rotatably supported on the front case half 2a and the rear case half 2b through bearings 35 and 36, respectively. The main shaft 30 has a rotational center line L2 parallel to the rotational center line L1 of the crankshaft.

The transmission M also includes a countershaft 33 rotatably supported on the front case half 2a and the rear case half 2b through bearings 37 and 38, respectively. The countershaft has a rotational center line L3 parallel to the rotational center line L1 of the crankshaft. The transmission M also includes a smaller intermediate shaft 34, fixed at its opposite ends to the front case half 2a and the rear case half 2b, and having an axis parallel to the rotational center line L1.

In addition, the transmission M includes a shift gear train group M1, as the set of gear trains G1 to G5 and GR for setting different shift positions, a shift position change mechanism M2 (see FIG. 4) as a selector mechanism for selecting a shift position to realize shifting at a gear ratio desired by the operator, and the first and second shift clutches 41 and 42 for transmitting the power of the engine E to the shift gear train group M1 and cutting off the transmission of the power to the shift gear train group M1.

In the transmission M, the main shaft 30, the countershaft 33, the intermediate shaft 34, and the drive shaft D are all arranged parallel to the crankshaft 5 and to one another. Each of the above-mentioned shafts 30, 33, and 34 and D are respectively supported on the crankcase 2, which also serves as a transmission case. Further, the axial direction of the crankshaft 5 is the same as the axial directions of the main shaft 30, the countershaft 33, and the intermediate shaft 34.

The main shaft 30 for receiving the power from the engine E includes a first main shaft 31 as a core portion and a second main shaft 32 as a sleeve disposed coaxially around the first main shaft 31. The first and second main shafts 31, 32 both extend in the crank chamber 8 and the front storage chamber 12. The second main shaft 32 is a hollow shaft that is fitted on the outer circumference of the first main shaft 31 so as to be rotatable relative thereto, and the first main shaft 31 coaxially extends through the second main shaft 32. The first main shaft 31 is formed with a radially projecting portion 31e as a positioning portion against which a rear axial end 32b of the second main shaft 32 abuts, in order to axially position the second main shaft 32 with respect to the first main shaft 31.

The first main shaft 31 is longer in the axial direction than the second main shaft 32, to thereby define the axial length of the main shaft 30. The first main shaft 31 includes an inner shaft portion 31a, disposed in the crank chamber 8, and also includes an outer shaft portion 31b disposed in the front storage chamber 12. The outer shaft portion 31b extends forwardly from the front case half 2a in the front storage chamber 12, and is rotatably supported at a front axial end 31c through a bearing 39 on the front cover 10. The first shift clutch 41, the driven gear 26, and the second shift clutch 42 are all supported on the outer shaft portion 31b, so as to be arranged in this order, extending from the front axial end 31c toward the crankcase 2.

The countershaft 33 is supported at a front axial end 33a thereof by the bearing 37, and is supported at a rear axial end 33b thereof by the bearing 38. The rear axial end 33b projects rearwardly from the bearing 38 into the rear storage chamber 13. An output drive gear 29a is provided on the rear axial end 33b of the countershaft 33 for driving the drive shaft D. The output drive gear 29a is rotatably supported, on the front case half 2a and the rear case half 2b, through bearings 27 and 28. The output drive gear 29a, provided on the countershaft 33, and an output driven gear 29b, provided on the drive shaft D, constitute a secondary speed reduction mechanism 29 for transmitting the power from the transmission M to the drive shaft D with speed reduction. The secondary speed reduction mechanism 29 is disposed in the rear storage chamber 13.

Referring to FIGS. 2 and 3, the shift gear train group M1 disposed in the crank chamber 8 serving also as a transmission chamber is provided by a shift gear group constituting a plurality of, or a predetermined number of shift gear trains G1 to G5 and GR. The shift gear group is composed of a predetermined number of (six in this preferred embodiment) drive gears 43 to 48 constituting a drive gear group provided on the main shaft 30, a predetermined number of (six in this preferred embodiment) driven gears 53 to 58 constituting a driven gear group provided on the countershaft 33, and intermediate gears 49 and 50 as speed reduction gears provided on the intermediate shaft 34. The annular projecting portion 31e is located axially between the drive gear 45 and the drive gear 44 formed at the rear axial end 32b.

More specifically, the first speed gear train G1, for setting the first speed shift position, is composed of the drive gear 43 provided on the inner shaft portion 31a so as to be rotatable relative thereto and the driven gear 53 meshing with the drive gear 43 and provided on the countershaft 33 so as to be rotatable integrally therewith.

The second speed gear train G2, for setting the second speed shift position, is composed of the drive gear 44 formed integrally with the second main shaft 32 so as to be rotatable integrally therewith and the driven gear 54 meshing with the drive gear 44 and provided on the countershaft 33 so as to be rotatable relative thereto.

The third speed gear train G3, for setting the third speed shift position, is composed of the drive gear 45 provided on the inner shaft portion 31a so as to be rotatable relative thereto and the driven gear 55 meshing with the drive gear 45 and provided on the countershaft 33 so as to be rotatable integrally therewith.

The fourth speed gear train G4, for setting the fourth speed shift position, is composed of the drive gear 46 formed integrally with the second main shaft 32 so as to be rotatable integrally therewith and the driven gear 56 meshing with the drive gear 46 and provided on the countershaft 33 so as to be rotatable relative thereto.

The fifth speed gear train G5, for setting the fifth speed shift position, is composed of the drive gear 47 provided on the inner shaft portion 31a so as to be rotatable integrally therewith and the driven gear 57 meshing with the drive gear 47 and provided on the countershaft 33 so as to be rotatable relative thereto.

The reverse gear train GR, for setting the reverse shift position, is composed of the drive gear 48 formed integrally with the drive gear 44, the driven gear 58 provided on the countershaft 33 so as to be rotatable relative thereto, the first intermediate gear 49 meshing with the drive gear 48 and provided on the intermediate shaft 34 so as to be rotatable relative thereto, and the second intermediate gear 50 meshing with the driven gear 58 and formed integrally with the first intermediate gear 49 so as to be rotatable integrally therewith.

The drive gears 44, 46, 47, and 48 and the driven gears 53 and 55 are restrained gears restrained to the main shaft 30 or the countershaft 33 in its rotational direction, so that these gears always rotate integrally with the shaft 30 or 33. On the other hand, the drive gears 43 and 45 and the driven gears 54, 56, 57, and 58 are free gears rotatable relative to the main shaft 30 or the countershaft 33 and rotating integrally with the shaft 30 or 33 only when a shift position (or gear ratio) is established. The drive gears 43, 45, and 47 respectively constituting the first-speed, third-speed, and fifth-speed shift gears are located on the rear side of the projecting portion 31e of the first main shaft 31. That is, these gears 43, 45, and 47 are fitted to the first main shaft 31 from its rear axial end 31d.

The gear trains G1, G3, and G5, respectively having the drive gears 43, 45, and 47 provided on the first main shaft 31 and constituting first drive gears, constitute a first shift portion for shifting the power from the engine E. The first shift clutch 41 performs the transmission and cut-off of the power to the first shift portion. On the other hand, the gear trains G2, G4, and GR respectively having the drive gears 44, 46, and 48 provided on the second main shaft 32 and constituting second drive gears constitute a second shift portion for shifting the power from the engine E. The second shift clutch 42 performs the transmission and cut-off of the power to the second shift portion.

The first shift clutch 41 is located axially adjacent to the centrifugal clutch C on the rear side thereof, and is splined to the front connecting portion 26a on the input side where the power of the engine E is transmitted through the centrifugal clutch C and the primary speed reduction mechanism R, so that the input side of the first shift clutch 41 is rotatable integrally with the driven gear 26. Further, the first shift clutch 41 is splined to the outer shaft portion 31b on the output side where the power is transmitted to the first main shaft 31, so that the output side of the first shift clutch 41 is rotatable integrally with the first main shaft 31.

The second shift clutch 42 is located axially opposite to the first shift clutch 41 with respect to the driven gear 26, and is splined to the rear connecting portion 26b on the input side where the power of the engine E is transmitted through the centrifugal clutch C and the primary speed reduction mechanism R, so that the input side of the second shift clutch 42 is rotatable integrally with the driven gear 26. Further, the second shift clutch 42 is splined to a front axial end 32a projecting from the bearing 35 into the front storage chamber 12 on the output side where the power is transmitted to the second main shaft 32, so that the output side of the second shift clutch 42 is rotatable integrally with the second main shaft 32.

The first and second shift clutches 41 and 42 are hydraulic multi-plate friction clutches, each having the same structure. Each of the first and second shift clutches 41 and 42 includes a bowl-shaped outer member 60, which serves as an input member and is splined to the outer circumference of the front connecting portion 26a or the rear connecting portion 26b so as to be rotatable integrally therewith. A plurality of first clutch plates 62 are engaged with the outer member 60 so as to be rotatable integrally therewith, and a plurality of second clutch plates 63 are alternately stacked on the first clutch plates 62. An inner member 61 serves as an output member with which the second clutch plates 63 are engaged so as to be rotatable integrally therewith, and a piston 64 is slidably fitted in the outer member 60 so as to push the first and second clutch plates 62 and 63 into contact with each other.

The first and second shift clutches 41 and 42 respectively include oil pressure chambers 65 and 66 defined by the respective outer members 60 and the respective pistons 64. The oil pressure chamber 65 of the first shift clutch 41 is located on the rear side axially nearer to the second shift clutch 42, and the oil pressure chamber 66 of the second shift clutch 42 is located on the front side axially nearer to the first shift clutch 41. The oil pressures in the oil pressure chambers 65 and 66 are controlled so that a hydraulic fluid is supplied to or discharged from the oil pressure chambers 65 and 66 through oil passages 67 and 68 provided in the front cover 10 and the outer shaft portion 31b. When the oil pressures in the oil pressure chambers 65 and 66 are increased, the piston 64 in each of the first and second shift clutches 41 and 42 is hydraulically moved against an elastic force of a return spring 69 to push the first and second clutch plates 62 and 63, so that the outer member 60 and the inner member 61 are rotated together by the friction between the first and second clutch plates 62 and 63, thus obtaining an engaged condition. Conversely, when the oil pressures in the oil pressure chambers 65 and 66 are decreased, the piston 64 in each of the first and second shift clutches 41 and 42 is returned by the elastic force of the return spring 69, so that the first and second clutch plates 62 and 63 are separated from each other and the transmission of the power from the outer member 60 to the inner member 61 is therefore cut off, thus obtaining a disengaged condition.

The oil pressures in the oil pressure chambers 65 and 66 are controlled by a hydraulic control device. The hydraulic control device includes an oil pump (not shown), which serves as an oil pressure source adapted to be driven by the crankshaft 5, and a control valve unit 71 for controlling the pressure of a hydraulic fluid discharged from the oil pump to thereby control the oil pressures in the oil pressure chambers 65 and 66. The control valve unit 71 includes a valve housing 71a (see FIG. 1) mounted on the front cover 10 and a plurality of hydraulic control valves accommodated in the valve housing 71a. The hydraulic control valves are controlled by an electronic control unit 70 to thereby control the supply and discharge of the hydraulic fluid to/from the oil pressure chambers 65 and 66 through the oil passages 67 and 68 provided in the first main shaft 31, thereby controlling the engaged/disengaged condition of the first and second shift clutches 41 and 42.

Figure 4:
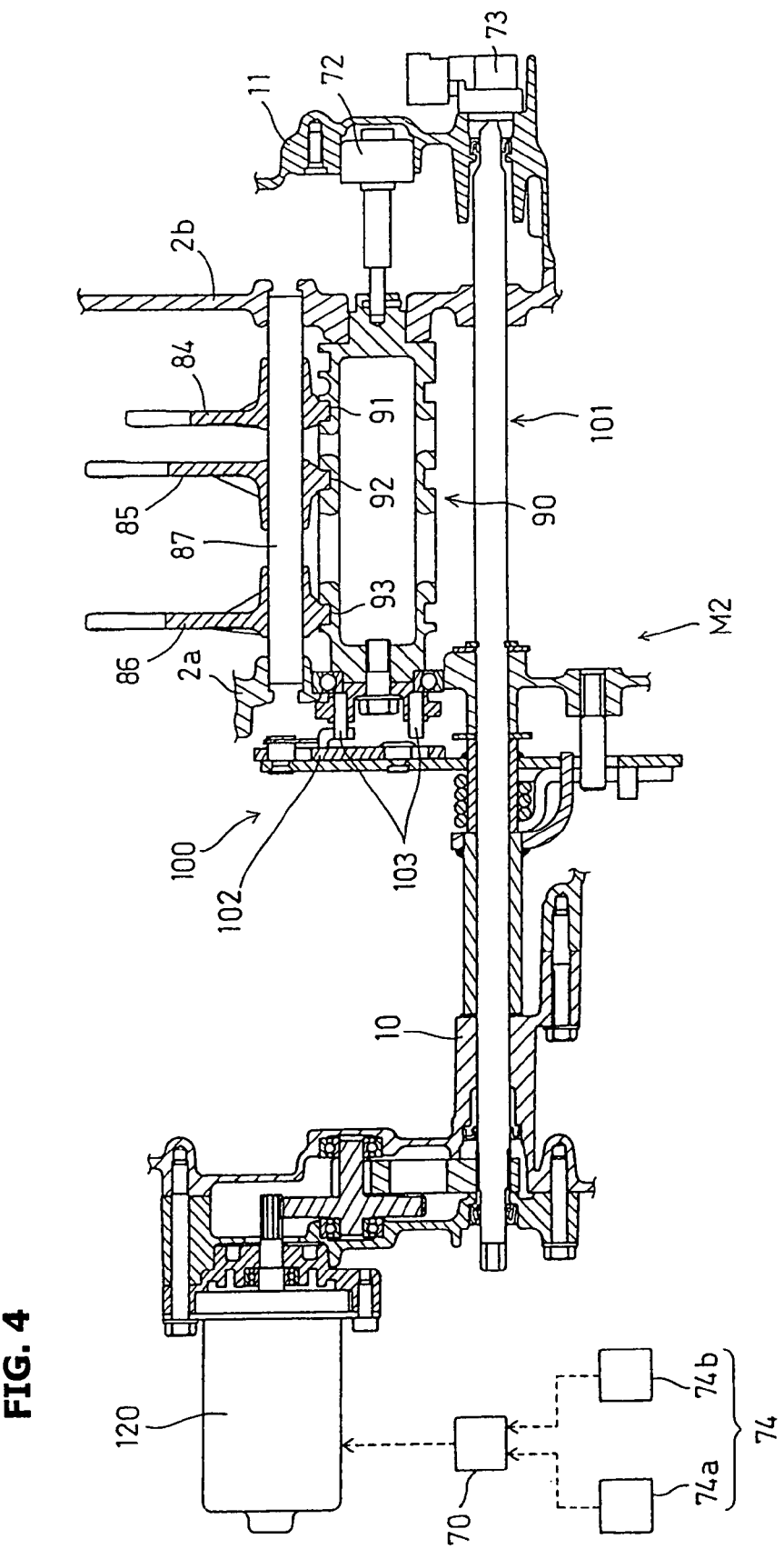
FIG. 4 is a schematic cross section of the gear transmission taken along the line IV-IV in FIG. 1.

Referring to FIGS. 2 to 4, the shift position change mechanism M2 is composed of a plurality of (three in this preferred embodiment) shifters 81 to 83 axially movable on the main shaft 30 or the countershaft 33 to make a connected condition where the gear trains G1 to G5 and GR are rotatable integrally with the main shaft 30 or the countershaft 33, or a disconnected condition where the gear trains G1 to G5 and GR are rotatable relative to the main shaft 30 or the countershaft 33.

The shift position change mechanism M2 includes a plurality of (three in this illustrative embodiment, the number being the same as that of the shifters 81 to 83) shift forks 84 to 86 axially slidably supported on a support shaft 87, which is supported on the front case half 2a and the rear case half 2b, to move the shifters 81 to 83.

The shift position change mechanism M2 also includes a shift drum 90 having an outer circumferential surface formed with cam grooves 91 to 93 for axially moving the shift forks 84 to 86 to thereby axially move the shifters 81 to 83, an intermittent feed mechanism 100 for intermittently rotating the shift drum 90, and a reversible electric motor 120 for operating the intermittent feed mechanism 100 according to vehicle operating conditions.

The three shifters 81 to 83 have engaging portions A1 to A6 that are engageable with the gears constituting the gear trains G1 to G5 and GR, and are composed of the first shifter 81 for making the change between the first speed shift position and the third speed shift position, the second shifter 82 for making the change between the fifth speed shift position and the reverse shift position, and the third shifter 83 for making the change between the second speed shift position and the fourth speed shift position.

The shift forks 84 to 86 are composed of the first shift fork 84 for engaging the first shifter 81, the second shift fork 85 for engaging the second shifter 82, and the third shift fork 86 for engaging the third shifter 83. The shift forks 84 to 86 are guided by the cam grooves 91 to 93 according to the rotation of the shift drum 90 to thereby move the respective shifters 81 to 83 to a selected position realizing the above-mentioned connected condition, or to a neutral position realizing the above-mentioned disconnected condition.

The first shifter 81 is provided by the drive gear 47, which also serves as a shifter, and which is splined to the inner shaft portion 31a between the drive gear 43 and the drive gear 45 so as to be axially movable on the inner shaft portion 31a. The first shifter 81 is selectively engageable with the drive gears 43 and 45, each of which is a specific gear. The first shifter 81 is integrally formed with the engaging portions A1 and A2 respectively engageable with the drive gears 43 and 45. Each of the engaging portions A1 and A2 is provided by projections.

The drive gear 43 is integrally formed with an engaging portion B1 engageable with the engaging portion A1 of the first shifter 81, and the drive gear 45 is integrally formed with an engaging portion B2 engageable with the engaging portion A2 of the first shifter 81.

When the first shifter 81 is moved rearwardly to one of the two selected positions that can be obtained by the first shifter 81, the engaging portion A1 comes into engagement with the engaging portion B1 of the drive gear 43 to thereby select the first speed gear train G1 (the first speed shift position), and at the same time, the first shifter 81 is disengaged from the drive gear 45. Conversely, when the first shifter 81 is moved forwardly to the other selected position, the engaging portion A2 comes into engagement with the engaging portion B2 of the drive gear 45 to thereby select the third speed gear train G3 (the third speed shift position), and at the same time the first shifter 81 is disengaged from the drive gear 43.

The second shifter 82 is provided by the driven gear 55, which also serves as a shifter, and which is splined to the countershaft 33 between the driven gear 57 and the driven gear 58 so as to be axially movable on the countershaft 33. The second shifter 82 is selectively engageable with the driven gears 57 and 58, each of which is a specific gear. The second shifter 82 is integrally formed with the engaging portions A3 and A4 respectively engageable with the driven gears 57 and 58. As in the first shifter 81, each of the engaging portions A3 and A4 is provided by projections. The driven gear 57 is integrally formed with an engaging portion B3 engageable with the engaging portion A3 of the second shifter 82, and the driven gear 58 is integrally formed with an engaging portion B4 engageable with the engaging portion A4 of the second shifter 82.

When the second shifter 82 is moved rearwardly to one of the two selected positions that can be obtained by the second shifter 82, the engaging portion A3 comes into engagement with the engaging portion B3 of the driven gear 57 to thereby select the fifth speed gear train G5 (the fifth speed shift position), and at the same time the second shifter 82 is disengaged from the driven gear 58. Conversely, when the second shifter 82 is moved forwardly to the other selected position, the engaging portion A4 comes into engagement with the engaging portion B4 of the driven gear 58 to thereby select the reverse gear train GR (the reverse shift position) as a gear train for reverse running of the vehicle, and at the same time the second shifter 82 is disengaged from the driven gear 57.

The third shifter 83 is splined to the countershaft 33 between the driven gear 54 and the driven gear 56 so as to be axially movable on the countershaft 33. The third shifter 83 is selectively engageable with the driven gears 54 and 56, each of which is a specific gear. The third shifter 83 is integrally formed with the engaging portions A5 and A6 respectively engageable with the driven gears 54 and 56. As in the first shifter 81, each of the engaging portions A5 and A6 is provided by projections. The driven gear 54 is integrally formed with an engaging portion B5 engageable with the engaging portion A5 of the third shifter 83, and the driven gear 56 is integrally formed with an engaging portion B6 engageable with the engaging portion A6 of the third shifter 83.

When the third shifter 83 is moved rearwardly to one of the two selected positions that can be obtained by the third shifter 83, the engaging portion A5 comes into engagement with the engaging portion B5 of the driven gear 54 to thereby select the second speed gear train G2 (the second speed shift position), and at the same time the third shifter 83 is disengaged from the driven gear 56. Conversely, when the third shifter 83 is moved forwardly to the other selected position, the engaging portion A6 comes into engagement with the engaging portion B6 of the driven gear 56 to thereby select the fourth speed gear train G5 (the fourth speed shift position), and at the same time the third shifter 83 is disengaged from the driven gear 54.

In this manner, any one of the shifters 81 to 83 is engaged with any one of the specific gears to thereby establish a shift position (gear ratio) obtained by any one of the gear trains G1 to G5 and GR, and the main shaft 30 operationally drives the countershaft 33 at this shift position (through any one of the gear trains G1 to G5 and GR) established through any one of the shifters 81 to 83 and the corresponding specific gear. When each of the shifters 81 to 83 takes the neutral position, none of the gear trains G1 to G5 and GR (no shift position) is selected, so that the transmission M becomes a neutral condition.

As regards the shift gears constituting the shift gear group (i.e., the drive gears 43 to 48 and the driven gears 53 to 58), the drive gears 43 and 45 and the driven gears 54, 56, 57, and 58 are engageable shift gears having the engaging portions B1 to B6.

Each of the engaging portions B1 to B6 is provided by projections arranged at intervals in the circumferential direction of each engageable shift gear. Each of the engaging portions B1 to B3 is formed as an outward engaging portion having an axial end Ba as an axially open end and a radial end Bo as a radially outward open end. In contrast, each of the engaging portions B4 to B6 is formed as an inward engaging portion having an axial end Ba and a radial end Bi as a radially inward open end. On the other hand, each of the engaging portions A1 to A3 respectively engageable with the engaging portions B1 to B3 is formed as an inward engaging portion having an axial end Aa as an axially open end and a radial end Ai as a radially inward open end. In contrast, each of the engaging portions A4 to A6 is formed as an outward engaging portion having an axial end Aa and a radial end Ao as a radially outward open end.

In contrast to connected ends of the engaging portions A1 to A6 and B1 to B6 connected to the shift gears or the shifters 81 to 83, the open ends mentioned above mean free ends not connected to the shift gears or the shifters 81 to 83. In FIG. 3, reference characters Aa, Ao, Ai, Ba, Bo, and Bi denote the above-mentioned parts of only some of the engaging portions A1 to A6 and B1 to B6, and the remaining parts are not labeled for purposes of avoiding complication.

Referring to FIG. 3, the drive gear 43 has a smallest outer diameter in the drive gear group and in the shift gear group. The drive gear 43 is composed of a body 43a and an engaging portion forming member 43b. The body 43a of drive gear 43 has a toothed portion 43a1, and the engaging portion forming member 43b is detachably mounted on the body 43a and has the engaging portion B1. The engaging portion forming member 43b is a member which is independent of the body 43a, and is an annular member splined to the outer circumference of a mounting portion 43a3 axially adjacent to a disc portion 43a2 of the body portion 43a and smaller in diameter than the toothed portion 43a1. Accordingly, the engaging portion forming member 43b is connected to the body 43a so as to be rotatable integrally therewith in the condition where the axial movement of the engaging portion forming member 43b is prevented by a stop ring 59 fitted to the inner shaft portion 31a.

The engaging portion B1 has an outer diameter larger than the outer diameter of the toothed portion 43a1 (i.e., the tip diameter of the toothed portion 43a1) and the root diameter of the toothed portion 43a1. The engaging portion B1 as a whole is located radially outside of the toothed portion 43a1 and is engaged with the engaging portion A1 at a radial position outside of the root diameter of the toothed portion 43a1.

Therefore, the drive gear 43 is a shift gear such that the radial width of the disc portion 43a2 is less than or equal to the radial width of the engaging portion B1. Further, the outer diameter of the engaging portion B1 is smaller than the outer diameter of the driven gear 53, which is largest in outer diameter in the shift gear group, and smaller than the outer diameter of the drive gear 47, which is largest in outer diameter in the drive gear group. The outer diameter of each engaging portion (e.g., the engaging portion B1) means the outer diameter of a locus obtained by rotation of this engaging portion (e.g., the engaging portion B1). Similarly, the inner diameter of each engaging portion means the inner diameter of a locus obtained by rotation of this engaging portion.

Referring to FIG. 4, the shift drum 90 has a rotational center line parallel to the rotational center lines L1 to L3, and is intermittently rotated in normal and reverse directions by the intermittent feed mechanism 100. The intermittent feed mechanism 100 includes a shift spindle 101 adapted to be rotationally driven by the electric motor 120 and a shifter plate 102 engageable with a plurality of feed pins 103 integral with the shift drum 90. A predetermined number (six in this preferred embodiment) of rotational positions, determining the shift positions in the transmission M, can be obtained by intermittent rotation of the shift drum 90.

The shift forks 84 to 86 are selectively guided by the cam grooves 91 to 93 to axially move according to the rotation of the shift drum 90, thereby allowing the selection of any one of the gear trains G1 to G5 and GR (see FIG. 3) corresponding to the above-mentioned predetermined rotational positions of the shift drum 90. The predetermined rotational positions of the shift drum 90 are detected by a rotational position sensor 72 provided by a potentiometer.

A rotational position sensor 73 for detecting a rotational position of the shift spindle 101 is mounted on the rear cover 11. The rotational position sensor 73 is also provided by a potentiometer.

The electronic control unit 70 controls the engaged/disengaged condition of the first and second shift clutches 41 and 42, and the rotational amount and rotational direction of the electric motor 120. The electronic control unit 70 inputs signals from operational condition detecting means 74 for detecting the operational conditions of the engine E and the vehicle, and also inputs signals from the rotational position sensors 72 and 73. The operational condition detecting means 74 includes vehicle speed detecting means 74a and accelerator opening detecting means 74b for detecting a load on the engine E. The electronic control unit 70 rotationally drives the shift spindle 101 according to the signals from the operational condition detecting means 74 to automatically control the shift positions in the transmission M according to the operational conditions detected by the operational condition detecting means 74. The electronic control unit 70 also feedback controls the rotational position of the shift spindle 101 according to the rotational position detected by the rotational position sensor 73.

The operation and effect of this preferred embodiment will now be described.

In the gear transmission M, a shift position is set by any one of the gear trains G1 to G5 and GR as selected by any one of the shifters 81 to 83. In the drive gear 43 as the specific gear adapted to be engaged with the shifter 81 to transmit the rotation of the main shaft 30 to the countershaft 33 at the above selected shift position, the outer diameter of the engaging portion B1 is set larger than the outer diameter of the toothed portion 43$a$1. Accordingly, the shifter 81 comes into engagement with the engaging portion B1 at a radial position outside of the toothed portion 43$a$1.

Thus, the drive gear 43, having a small diameter such that the radial width of the disc portion 43$a$2 is smaller than the radial width of the engaging portion B1, can be used as the specific gear, thereby increasing the number of choices for the specific gear. As a result, any shift gear can be used as the specific gear without depending upon the outer diameter of the shift gear, so that the flexibility of layout of the shift gears on the main shaft 30 and the countershaft 33 can be increased and the flexibility of layout of the shifters 81 to 83 can also be increased. Further, the specific gear and each shifter can be reduced in weight to thereby allow a reduction in size and weight of the transmission M.

The drive gear 43 is composed of the body 43$a$ having the toothed portion 43$a$1, and the engaging portion forming member 43$b$ detachably mounted on the body 43$a$ and having the engaging portion B1. Accordingly, the body 43$a$ having the toothed portion 43$a$1 can be manufactured separately from the engaging portion forming member 43$b$ having the engaging portion B1, so that the toothed portion 43$a$1 can be formed without the limitation by the engaging portion B1 larger in outer diameter than the toothed portion 43$a$1, that is, the body 43$a$ can be easily manufactured. As a result, the drive gear 43, having the engaging portion B1 larger in outer diameter than the toothed portion 43$a$1, can be easily manufactured, thereby contributing to a cost reduction.

The drive gear 43 as the first speed drive gear is a gear having a smallest outer diameter in the drive gears 43 to 48 or in the drive gears 53 to 58. Accordingly, it is possible to prevent an increase in radial size of the shift gear group due to the provision of the engaging portion B1 on the drive gear 43. As a result, although the shift gear group includes the shift gear (the drive gear 43) having the engaging portion B1 larger in outer diameter than the toothed portion 43$a$1, an increase in size of the transmission M can be prevented.

Each of the engaging portions B1 to B6 is formed as the outward engaging portion or the inward engaging portion, and the engaging portions A1 to A6 of the shifters 81 to 83 are composed of the engaging portions A1 to A3 respectively engageable with the engaging portions B1 to B3 and the engaging portions A4 to A6 respectively engageable with the engaging portions B4 to B6, wherein each of the engaging portions A1 to A3 is formed as the inward engaging portion and each of the engaging portions A4 to A6 is formed as the outward engaging portion.

Accordingly, as compared with a conventional engaging portion having a radially outward open end and a radially inward open end, the axially projecting engaging portion (e.g., the engaging portion B2 or A4) in the structure of the disclosed embodiment hereof has a radially outward open end and a radially inward closed end as a connected end. With this structure, the rigidity of each engaging portion can be increased, so that each engaging portion can be made compact and each shifter and each engageable shift gear can be reduced in size and weight.

The drive gear 43 is fitted to the first main shaft 31 from the rear axial end 31$d$. Accordingly, the drive gear 45 and the drive gear 47, which are to be axially interposed between the projecting portion 31$e$ and the drive gear 43, can be mounted to the first main shaft 31 from the rear axial end 31$d$. Thus, the drive gears 45 and 47 can be easily mounted to the first main shaft 31.

The above preferred embodiment may be modified in the following manner.

The engaging portion B1 may be engaged with the shifter 81 at a radial position where the former radially overlaps the toothed portion 43$a$1.

Further, any shift gear other than the drive gear 43 may have an engaging portion forming member under the condition that the radial width of the disc portion is smaller than the radial width of the engaging portion. Further, the engaging portion forming member and the body of the shift gear may be integrally formed.

Each shifter may not serve as a shift gear.

The internal combustion engine may be a multi-cylinder internal combustion engine. Further, the engine may be any type of internal combustion engine and is not limited to the reciprocating type internal combustion engine, or alternatively may be a power plant.

While a working example of the present invention has been described above, the present invention is not limited to the working example described above, but various design alterations may be carried out without departing from the present invention as set forth in the claims.

What is claimed is:

1. A gear transmission comprising:
    a main shaft for inputting power from an engine, said main shaft having a predetermined number of drive gears operatively mounted thereon;
    a counter shaft having a predetermined number of driven gears operatively mounted thereon, the number of which is the same as the number of said drive gears, said driven gears being respectively driven by said drive gears to set predetermined shift positions; and
    a shifter adapted to be moved on said main shaft or said counter shaft to thereby come into engagement with a specific gear of said drive gears and said driven gears, said shifter being integrally attached to another gear of said drive gears and said driven gears disposed adjacent to said specific gear;
    wherein said specific gear comprises a toothed portion and an engaging portion operatively attached to the toothed portion for concurrent rotation therewith, the engaging portion configured to engage said shifter, whereby said main shaft rotationally drives said counter shaft through said shifter and said specific gear at any one of said predetermined shift positions;
    wherein an outer diameter of said engaging portion is larger than an outer diameter of the toothed portion of said specific gear.

2. The gear transmission according to claim 1, wherein said specific gear comprises:

a body, the body comprising said toothed portion; and an engaging portion forming member detachably mounted on said body, the engaging portion forming member comprising said engaging portion.

3. The gear transmission according to claim 2, wherein the entirety of the engaging portion is located radially outside of the toothed portion and is engaged with a shifter engaging portion of said shifter at a location outside a root diameter of the toothed portion.

4. The gear transmission according to claim 1, wherein said specific gear is a gear having a smallest outer diameter of the group of gears comprising said drive gears and said driven gears.

5. The gear transmission according to claim 1, wherein:
said main shaft comprises:
  a first main shaft, and
  a second main shaft fitted to the outer circumference of said first main shaft so as to be rotatable relative thereto;
said drive gears comprise first drive gears provided on said first main shaft and second drive gears provided on said second main shaft;
said gear transmission further comprises:
  a first shift clutch for performing the transmission of, and cut off of, the power from said engine to said first main shaft, and
  a second shift clutch for performing the transmission and cut-off of the power from said engine to said second main shaft; and
said specific gear is a first speed drive gear constituting said first drive gears.

6. The gear transmission according to claim 1, wherein said specific gear comprises:
a body, the body comprising said toothed portion and a mounting portion; and
an engaging portion forming member formed independent of said body and detachably secured to said mounting portion via a spline connection, the engaging portion forming member comprising said engaging portion.

7. The gear transmission according to claim 6, wherein the engaging portion forming member is substantially annular in shape and rotates integrally with the body.

8. The gear transmission according to claim 6, wherein the gear transmission further comprises a stop ring fitted to a gear shaft which supports the specific gear, the stop ring axially confronting the body of the specific gear such that the engaging portion forming member is maintained in connection with the body.

9. The gear transmission according to claim 1, wherein the outer diameter of the engaging portion is smaller than the both an outer diameter of the largest driven gear and an outer diameter of the largest drive gear.

10. A vehicle comprising a power source, a gear transmission, and at least one drive wheel, the gear transmission transmitting power from the power source to the at least one drive wheel, the gear transmission comprising:
a main shaft for inputting power from the power source, said main shaft having a predetermined number of drive gears;
a counter shaft having a predetermined number of driven gears, the number of driven gears being the same as the number of said drive gears, said driven gears being respectively driven by said drive gears to set predetermined shift positions; and
a shifter adapted to be moved on said main shaft or said counter shaft to thereby come into engagement with a specific gear of said drive gears and said driven gears,
said shifter being integrally attached to another gear of said drive gears and said driven gears disposed adjacent to said specific gear;
wherein said specific gear comprises a toothed portion and an engaging portion, the engaging portion operatively attached to the toothed portion for concurrent rotation therewith, said engaging portion configured to engage said shifter, whereby said main shaft rotationally drives said counter shaft through said shifter and said specific gear at any one of said predetermined shift positions; and
wherein outer diameter of said engaging portion is larger than an outer diameter of the toothed portion of said specific gear.

11. The vehicle according to claim 10, wherein said specific gear comprises:
a body, the body comprising said toothed portion; and
an engaging portion forming member detachably mounted on said body, the engaging portion forming member comprising said engaging portion.

12. The vehicle according to claim 11, wherein the entirety of the engaging portion is located radially outside of the toothed portion and is engaged with a shifter engaging portion of said shifter at a location outside a root diameter of the toothed portion.

13. The vehicle according to claim 10, wherein said specific gear is a gear having a smallest outer diameter of the group of gears comprising said drive gears and said driven gears.

14. The vehicle according to claim 10, wherein:
said main shaft comprises a first main shaft, and a second main shaft fitted to the outer circumference of said first main shaft so as to be rotatable relative thereto;
said drive gears comprise first drive gears provided on said first main shaft and second drive gears provided on said second main shaft;
said gear transmission further comprises:
  a first shift clutch for performing the transmission and cut-off of, and cut off of, the power from said engine to said first main shaft, and
  a second shift clutch for performing the transmission and cut-off of the power from said engine to said second main shaft; and
wherein said specific gear is a first speed drive gear of said first drive gears.

15. The vehicle according to claim 10, wherein said specific gear comprises:
a body, the body comprising said toothed portion and a mounting portion; and
an engaging portion forming member formed independent of said body and detachably secured to said mounting portion via a spline connection, the engaging portion forming member comprising said engaging portion.

16. The vehicle according to claim 15, wherein the engaging portion forming member is substantially annular in shape and rotates integrally with the body.

17. The vehicle according to claim 15, wherein the gear transmission further comprises a stop ring fitted to a gear shaft which supports the specific gear, the stop ring axially confronting the body of the specific gear such that the engaging portion forming member is maintained in connection with the body.

18. The vehicle according to claim 10, wherein the outer diameter of the engaging portion is smaller than the both an outer diameter of the largest driven gear and an outer diameter of the largest drive gear.

19. A gear transmission comprising:

a main shaft for inputting power from an engine, said main shaft having a predetermined number of drive gears;

a counter shaft having a predetermined number of driven gears the number of which is the same as the number of said drive gears, said driven gears being respectively driven by said drive gears to set predetermined shift positions; and a shifter adapted to be moved on said main shaft or said counter shaft to thereby come into engagement with a specific gear of said drive gears and said driven gears, said shifter being integrally attached to another gear of said drive gears and said driven gears disposed adjacent to said specific gear;

wherein said specific gear comprises a toothed portion and an engaging portion, the engaging portion configured to engage said shifter, whereby said main shaft rotationally drives said counter shaft through said shifter and said specific gear at any one of said predetermined shift positions;

said specific gear is a gear having a smallest outer diameter of the group of gears comprising said drive gears and said driven gears;

wherein an outer diameter of said engaging portion is larger than an outer diameter of the toothed portion of said specific gear;

wherein said specific gear comprises:
 a body, the body comprising said toothed portion; and
 an engaging portion forming member detachably mounted on said body, the engaging portion forming member comprising said engaging portion;

wherein:
 said main shaft comprises
  a first main shaft, and
  a second main shaft fitted to the outer circumference of said first main shaft so as to be rotatable relative thereto;
 said drive gears comprise a first drive gear provided on said first main shaft and a second drive gear provided on said second main shaft;
 said gear transmission further comprises
  a first shift clutch for selectively engaging or disengaging power from said engine to said first main shaft, and
  a second shift clutch for selectively engaging or disengaging power from said engine to said second main shaft; and
 said specific gear is a first speed drive gear constituting said first drive gear.

20. The gear transmission according to claim 19, wherein the engaging portion has a radially outward open end and a radially inward closed end as a connected end.

21. The gear transmission according to claim 19, wherein the shifter is integrally formed with and affixed to one of said drive gears or said driven gears;

and wherein when the specific gear engages the shifter, an engaging portion of the shifter and the engaging portion of the specific gear overlap one another in the axial direction of the main shaft.

22. The gear transmission according to claim 19, wherein the outer diameter of the engaging portion of the specific gear is smaller than the outer diameter of the drive or the driven gear of the shifter.

* * * * *